US011724263B2

(12) United States Patent
Dueweke

(10) Patent No.: US 11,724,263 B2
(45) Date of Patent: Aug. 15, 2023

(54) DUAL-BLADE AGRICULTURAL GRINDER

(71) Applicant: Sesh Technologies Manufacturing Inc., Spokane, WA (US)

(72) Inventor: Jason Dueweke, Spokane, WA (US)

(73) Assignee: Sesh Technologies Manufacturing Inc., Spokane, WA (US)

( * ) Notice: Subject to any disclaimer, the term of this patent is extended or adjusted under 35 U.S.C. 154(b) by 922 days.

(21) Appl. No.: 16/663,599

(22) Filed: Oct. 25, 2019

(65) Prior Publication Data

US 2021/0120747 A1 Apr. 29, 2021

(51) Int. Cl.
*B02C 18/12* (2006.01)
*A01G 3/00* (2006.01)

(52) U.S. Cl.
CPC .............. *B02C 18/12* (2013.01); *A01G 3/002* (2013.01); *B02C 2201/066* (2013.01)

(58) Field of Classification Search
CPC ... A01G 3/002; A01G 2003/005; A01F 29/02; A01F 29/06; A01F 29/095; B02C 18/08; B02C 2201/066; B02C 7/18; B02C 9/00; B02C 9/02; B02C 18/12; B02C 18/304
See application file for complete search history.

(56) References Cited

U.S. PATENT DOCUMENTS

| 2,186,716 | A | | 1/1940 | Dieckmann | |
|---|---|---|---|---|---|
| 4,074,869 | A | * | 2/1978 | Johnson | A01G 3/002 74/52 |
| 4,477,029 | A | * | 10/1984 | Green | B02C 18/18 241/101.78 |
| 2010/0200682 | A1 | * | 8/2010 | Maaren | B02C 4/08 241/230 |

(Continued)

FOREIGN PATENT DOCUMENTS

| CA | 2081240 A1 | * | 4/1993 |
|---|---|---|---|
| CN | 109168668 A | * | 1/2019 |

(Continued)

OTHER PUBLICATIONS

International Preliminary Report on Patentability for PCT Application No. PCT/US20/56664, dated May 5, 2022, 8 pages.

(Continued)

*Primary Examiner* — Shelley M Self
*Assistant Examiner* — Jared O Brown
(74) *Attorney, Agent, or Firm* — Lee & Hayes, P.C.

(57) ABSTRACT

Systems and methods for a dual-blade agricultural grinder are disclosed. A dual blade grinder comprises a casing, a hopper, a cutting mechanism, a chute, and a display. The grinder is configured to cut a plant to a desired particle size. The casing is configured to provide rigid structural support for components of the grinder and provide a safety barrier between the user and the cutting mechanism. The hopper is configured to store and distribute a plant to the cutting mechanism. The cutting mechanism comprises a static blade with one or more serrated edges and one or more plain edges, a floating curved blade, and a particle screen. The display is configured to accept input from a user operating the grinder, and to control operational settings of the grinder. The grinder and its components may be comprised of a food-grade quality steel configured to resist bacterial growth.

20 Claims, 7 Drawing Sheets

(56) References Cited

U.S. PATENT DOCUMENTS

2018/0015478 A1* 1/2018 Yunger .................. B02C 13/282
2019/0246568 A1* 8/2019 Seidel .................... A01G 3/002
2020/0353473 A1* 11/2020 Hayman ............. B02C 18/0084

FOREIGN PATENT DOCUMENTS

| EP | 0630686 A1 | | 12/1994 |
|----|------------|---|---------|
| EP | 2281634 A1 | | 2/2011 |
| KR | 20100036050 A | * | 4/2010 |
| WO | WO-8301913 A1 | * | 6/1983 |
| WO | WO2019159975 A1 | | 8/2019 |

OTHER PUBLICATIONS

PCT Search Report and Written Opinion dated Jan. 27, 2021 for PCT Application No. PCT/US2020/056664, 9 pages.

* cited by examiner

DUAL-BLADE AGRICULTURAL GRINDER

BACKGROUND

Machines may be used to cut up agricultural material for a repurposed use. Machines designed to cut agricultural material to a predefined particle size may be used to produce a manufactured product. Described herein are improvements in technology and solutions to technical problems that may be used to, among other things, enhance the experience for users cutting agricultural material.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
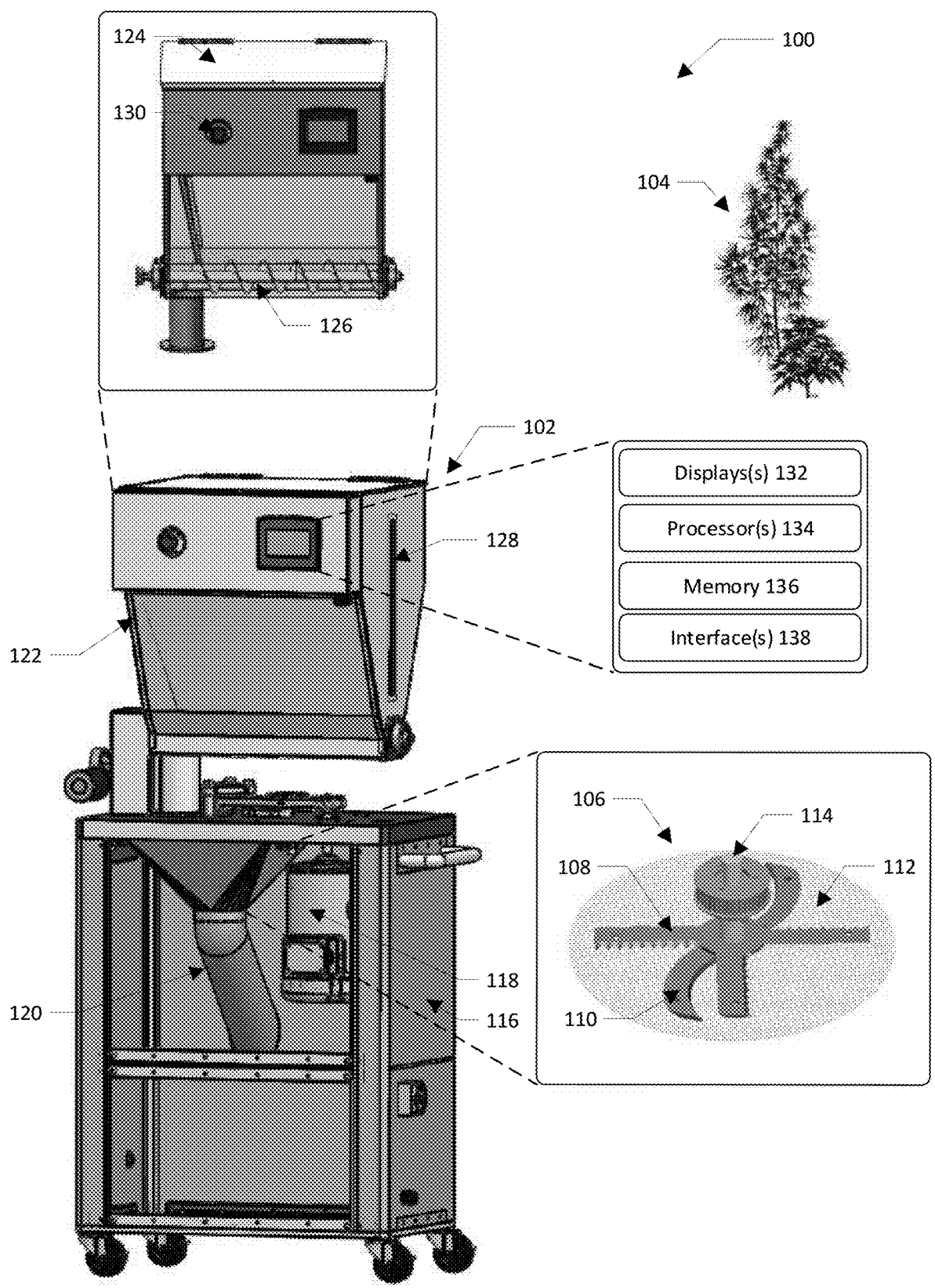
FIG. 1 illustrates a schematic diagram of an example agricultural grinder system.

A dual-blade agricultural grinder and systems for use thereof are disclosed. Take for example, an environment such as a room with a pile of unprocessed or raw agricultural material where one or more users reside. Such users may desire to dispose of and/or repurpose the unprocessed agricultural material by themselves. The grinder may be configured with a variety of cutting mechanisms, an example cutting mechanism may be configured such that one or more blades work together to cut the raw agricultural material. Example cutting mechanism configurations may include at least one blade that is configured to rotate statically with a shaft that is operably coupled to a motor. Example cutting mechanism configurations may also include at least one blade that is configured to rotate independently from the shaft. Example cutting mechanism configurations may also include at least one particle screen that is configured to restrict movement of raw agricultural material that has not yet been processed to a desired particle size. Such agricultural material may be inconsistent in nature and require different means for transportation and/or processing to produce a manufactured product. Such products may be unique and require different standards of processing the raw agricultural material to produce a desired grade of quality of the processed agricultural material.

Example standards may be ensuring that once the raw agricultural material is processed, the processed agricultural material is of a desired particle size. Such users may desire that the processed agricultural material is coarser in particle size or finer in particle size and may change a configuration of the agricultural grinder to achieve these desired results. Such users may also desire to change a rotational direction of cutting blades in the grinder such that in the event of the raw agricultural material collecting in one area creating a jam, the grinder may effectively remedy the jam by changing the cutting direction. The grinder may be configured such that the cutting mechanism is housed by a casing such that a user operating the grinder cannot directly access the cutting mechanism. The casing may be configured to act as a safety measure for the grinder, and the grinder may be configured such that a number of other safety measures may be implemented. The grinder may be configured such that a user may utilize a display mounted on the case of the grinder presenting a graphical user interface (GUI) to control the rotational direction, speed and/or percentage of available power from the motor, and/or cutting techniques of blades there within. The grinder may be configured to automatically and/or continuously move raw and/or unprocessed agricultural material toward the blades for grinding. The grinder may be configured such that the processed agricultural material is routed from the inside of the case to a bin or storage outside of the case.

To illustrate, an example agricultural processing environment may have a container with raw unprocessed agricultural material and a grinder disposed on a ground surface therein. The raw unprocessed agricultural material may be a plant having a number of parts, such as stems, flowers, roots, and/or seeds. Some parts of the plant may be undesirable to a user. In examples, a user may process the plant through the grinder to produce a processed version of the plant, which may contain only parts of the plant that are desirable to the user. In examples, the desirable parts of the plant may be the flowers, and/or the undesirable parts may be the stems and/or seeds. In examples, a processed version of the plant may only contain the flowers of the plant.

As will be discussed in more detail below, the grinder may be comprised of separate parts in combination with one another, such as a casing, a motor, a hopper, a cutting mechanism, a chute, a display, and/or one or more buttons. The casing may provide support for the grinder and enclose one or more of the components of the grinder. The casing may be configured such that in its operational state, the cutting mechanism of the grinder may not be accessible to a user. The motor may be operably connected to a number of components of the grinder. The motor may be configured such that a user may specify a speed, such as, for example, a percentage of available power from the motor at which the motor will operate. In some examples, the motor may be configured to operate at any value from 0 to 100 percent of the available power from the motor, where 0 percent may be the lowest available power from the motor and 100 percent may be the highest available power from the motor. The motor may be configured such that it provides operational power to a number of components of the grinder at the speed specified by the user. The hopper may be connected to a passageway of the casing. The hopper may have a screw or an auger that is operably coupled to the motor of the grinder. The hopper may be configured to contain a desired volume of an unprocessed plant for processing. The hopper may be configured to direct the unprocessed plant, using the auger, in the direction of the cutting mechanism such that a user need not direct the unprocessed plant manually. The grinder may be configured such that the unprocessed plant is transported to the cutting mechanism by the auger in the hopper.

The cutting mechanism may be configured to have one or more static blades attached to a shaft that is operably coupled to the motor such that the static blade(s) rotate with the shaft in its rotational direction. The cutting mechanism may be configured to have one or more floating blades configured to rotate about the shaft, independent of its rotational direction. The floating blade(s) may comprise one or more bearings, allowing the floating blade(s) to spin freely while the shaft rotates. The cutting mechanism may be configured to have one or more particle screens configured to allow passage of desired parts of the plant that has been processed to a desired particle size.

The chute may be configured to enclose the cutting mechanism. The chute may be configured to transport the processed version of the plant from the cutting mechanism to an outside of the casing. In examples, the chute may transport the processed version of the plant to a collection bin. The display may be mounted on the casing of the grinder. The display may be configured such that a graphical user interface (GUI) is presented to a user, and/or the GUI may be configured to receive input from the user. In examples, the display may be configured to be a touch sensitive display, such that the GUI may be configured to receive touch input from a user via the touch sensitive display. The user input may be configured to control the rotational direction and/or available power from the motor controlling the speed of the cutting mechanism. The button(s) may be mounted on the casing of the grinder and/or configured such that when a user actuates the button, the grinder stops the rotation of the cutting mechanism.

The cutting mechanism may be arranged in a number of ways. In examples, the cutting mechanism may be comprised of any number of blade layers and/or any number of particle screen layers. In examples, the layers may comprise a static blade layer, a floating blade layer, and/or a particle screen layer. In examples, the floating blade layer may be arranged such that the static blade layer is above the floating blade layer, and/or the particle screen layer is below the floating blade layer. In examples, the static blade layer may be arranged such that the floating blade layer is above the static blade layer, and/or the particle screen layer is below the static blade layer. In examples, the cutting mechanism may be configured to rotate clockwise or counterclockwise depending on user input. In examples, the cutting mechanism may be configured such that the static blade layer may rotate in a first direction, and/or the floating blade layer may rotate in a second direction opposite of the first direction. The cutting mechanism may be configured such that the static blade layer may be fixed to and/or rotate with a shaft that is operably coupled to a motor of the grinder. The cutting mechanism may be configured such that the floating blade layer may comprise a bearing configured to allow the floating blade layer to rotate independently from the shaft that is operably coupled to the motor. The cutting mechanism may be configured such that the particle screen layer may remain stationary as the blade layers rotate. The cutting mechanism may be configured such that the particle screen is interchangeable.

The static blade may be arranged in a number of ways. The static blade may have a disc portion having a first circumference. The static blade may have a first planar side and a second planar side. The static blade may have a hole through the middle of the disc portion, the hole may be configured such that a shaft extends therethrough and/or is statically fastened to the disc portion of the static blade. The static blade may be configured to have one or more blade portions. The one or more blade portions may be diametrically opposed and/or positioned equidistantly about the first circumference of the disc. Each of the blade portions may be configured to have two cutting surfaces, one on each side of the blade portion, the cutting surfaces being on opposite sides. The cutting surfaces of the static blade may extend radially outward from the disc to second circumference that is greater than the first circumference. The cutting surfaces may be any surface used for cutting, such as a serrated edge, a plain edge, etc. The serrated edge may comprise any number of teeth. A single tooth of the teeth may be formed by a first arched recess in the serrated cutting edge meeting a neighboring second arched recess in the serrated cutting edge, the meeting point forming a point of the tooth. The static blade may be comprised of a food-grade steel such that it is resistant to bacterial growth.

The floating blade may be arranged in a number of ways. The floating blade may have a disc portion having a first circumference. The floating blade may have a first planar side and a second planar side. The floating blade may have a hole through the middle of the disc portion, the hole may include one or more food-grade bearings configured such that a shaft extends therethrough without imposing a rotational force on the floating blade. The floating blade may be configured to rotate in response to the unprocessed plant moving through the cutting mechanism. The floating blade may be configured to have one or more blade portions. The one or more blade portions may be diametrically opposed and/or positioned equidistantly about the first circumference of the disc. Each of the blade portions may be configured to have two cutting surfaces, one cutting surface on each side of the blade portion, the cutting surfaces being on opposite sides. The cutting surfaces of the floating blade may curve radially outward from the disc to a second circumference that is greater than the first circumference, forming two paralleled curved cutting surfaces. The cutting surfaces may be any surface used for cutting, such as a serrated edge, a plain edge, etc. The floating blade may be comprised of a food-grade steel such that it is resistant to bacterial growth.

The particle screen may be configured to catch plant material moving through the cutting mechanism that has not yet been ground to a desired particle size. The particle screen may be comprised of a food-grade steel such that it is resistant to bacterial growth. The particle screen may be a disc shaped planar surface having a number of cavities in the surface. The particle screen may have a radius that is greater than or equal to the greater diameters of the static blade and/or the cutting blade. The cavities may be any shape, for example, the cavities may be configured to be a disc shape similar to the surface. The cavities may be configured to resemble other shapes, for example, the cavities may be square, oval, rectangular, triangular, etc. The particle screen may be configured such that it is interchangeable with other particle screens having different sized cavities. The cavities may be configured to further cut the plant moving through the cutting mechanism. The particle screen may be configured such that a shaft of the grinder extends through a hole in the middle of the planar surface. The particle screen may be configured to remain stationary as the shaft rotates the cutting mechanism.

The casing may be configured to provide structural support for some or all of the components of the grinder. The casing may be comprised of a food-grade quality steel such that it is resistant to bacterial growth. The casing may be configured to house only the cutting mechanism of the grinder. The casing may be used as a support for mounting components of the grinder thereto. In examples, the casing may have a number of wheels and configured such that it is easy to move the grinder. The casing may be configured with a number of safety features. In examples, the casing may house any moving mechanical parts of the grinder, such that when the grinder is being operated a user does not have immediate direct access to these moving mechanical parts. In examples, the casing may be configured such that a side wall of the casing is temporarily removable for a user to access the cutting mechanism, motor, chute, etc. In examples, the casing may be arranged such that the hopper and/or the chute is part is of the casing.

The hopper may be configured to temporarily store unprocessed plants before processing them through the grinder. In examples, the hopper is mounted on the top of the casing. Additionally, or alternatively, the hopper may be separate from the casing, or mounted on a side of the casing. The hopper may have an opening on the top surface, such that a user can place unprocessed plants for processing. In examples, the hopper may have a door or lid on a hinge configured to close off the opening on the top surface of the hopper. In examples, the hopper may be substantially shaped as a triangular prism configured to funnel unprocessed plant material to the bottom end of the hopper. Additionally, or alternatively, the hopper may be substantially shaped as a number of geometric prisms, for example, the hopper may be rectangular, spherical, or something of the like. The hopper may be arranged such the opening on the top surface of the hopper is the widest portion of the hopper, and the hopper continuously narrows moving downward to form a funnel like shape. The hopper may have an auger, or a screw disposed on the inside of the hopper volume. The auger may be operably coupled to a motor of the grinder. The auger may be configured to rotate and move the unprocessed plants to a side of the auger and in a first direction toward the cutting mechanism. Additionally, or alternatively, the auger may be configured to rotate in a second direction away from the cutting mechanism. The auger may be arranged such that it is at the bottom and/or narrowest portion of the hopper. The hopper may be configured to provide structural support for a number of components of the grinder. In examples, the hopper may provide support for a display and/or a button. In examples, the hopper may be configured such that a portion of one of the sides of the hopper is transparent and allows for a user to safely look at the inside of the hopper while the grinder is in an on or off state of operation.

The chute may be configured to catch and transport the plant after being processed through the cutting mechanism. In examples, the chute may be arranged such that it encloses the cutting mechanism inside of the casing of the grinder. Additionally, or alternatively, the chute may be arranged below the cutting mechanism and configured to catch the processed version of the plants, after being cut by the cutting mechanism. In examples, the chute may be configured to transport the processed version of the plant from the cutting mechanism to an outside of the casing of the grinder. Additionally, or alternatively, the chute may be configured to transport the processed version of the plant to a collection bin on the inside of the casing of the grinder.

The motor may be operably coupled to a number of components of the grinder. The motor may be configured s that a user may specify a standard of speed, such as, for example, a percentage of available power from the motor at which the motor will operate. In some examples, the motor may be configured to operate at any value from 0 to 100 percent of the available power from the motor, where 0 percent may be the lowest available power from the motor and 100 percent may be the highest available power from the motor. In examples, the motor may be configured to provide operational power to a number of components of the grinder at the speed specified by the user.

The display may have at least one processor and at least one memory. Additionally, or alternatively, the display may be communicably coupled to one or more external computing devices. The memory may have instructions stored thereon causing the processor to perform one or more actions, such as, for example, presenting a Graphical User Interface (GUI) on the display. The GUI may be configured to accept input from a user to cause the grinder to perform an action, such as adjusting cutting speed and/or available power available from the motor, cutting direction, and hopper functionality for example. The GUI may also be configured to power on and power off the grinder. Other actions the grinder may be able to perform are, for example, safety settings, on/off timer, and timed speed changes to form different grinding patterns.

The one or more buttons may be configured to cause the grinder to perform an immediate action upon actuation, without any additional processing. In examples, when a user physical actuates a button, the grinder may be configured to cease all operation. In examples, the one or more buttons may be configured to perform one or more actions associated with the grinder.

Take for example, an environment where a user desires to process a freshly harvested hemp plant with the disclosed grinder. In this example, the user performs the following steps to process the hemp plant with the grinder. The user may open the lid on the top of the hopper and place a desired amount of the plant in the hopper. The user may look through the transparent side window of the hopper to verify the correct amount of plant has been placed in the hopper. The user may turn on the grinder by pressing a button and/or actioning the display. The user may select the desired operation settings for the grinder by touching the GUI elements on the display. The user may start the cutting mechanism by selecting an action on the display. The user may start the auger and the cutting mechanism separately. The auger may push rotate and push the hemp toward the cutting mechanism. As the hemp moves into the cutting mechanism, the static blade rotates in a first cutting direction, leading with the serrated edge of the blade. As the static blade rotates and cuts the hemp, the serrated edge of the static blade is configured to hold the hemp as it makes contact. As the hemp that is held by the static blade rotates with the static blade it comes into contact with a cutting surface of the floating blade that is positioned below the static blade. As the hemp comes into contact with the floating blade the hemp may be further cut by the floating blade, which may change rotational direction as needed to cut the hemp to a desired particle size. The hemp may remain in the cutting mechanism until the hemp reaches a particle size that fits through the particle screen. In an example where the cutting mechanism slows or jams, the user may reverse the rotational direction of the static blade by providing input to the touch display. As the hemp falls through and gets cut by the cutting mechanism, additional hemp may move from the top of the hopper to the bottom of the hopper. As the hemp falls through the particle screen, the processed hemp may move down the chute. The chute may be positioned to direct the processed hemp to a bin located on the outside of the grinder casing. The user may repeat the process as desired.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example dual-blade agricultural grinder system 100. The grinder system 100 may include a grinder 102 and an unprocessed plant 104. The plant 104 may have a number of parts including but not limited to, stems, seeds, roots, and/or flowers. Some parts of the plant may be undesirable to a user operating the grinder 102. The grinder 102 may be configured to cut the plant 104 in such a way that desired parts of the plant 104 are collected and undesired parts are not collected after the plant 104 is processed through the grinder 102. In examples, the desirable part(s) of the plant 104 may be the flowers. Additionally, or alternatively, the undesirable part(s) of the plant may be the stems, seeds, and/or roots of the plant 104. In examples, a version of the plant 104 which has been processed through the grinder 102 may only contain the flowers of the plant 104.

The grinder 102 may include a cutting mechanism 106. The cutting mechanism 106 may include one or more blades, such as a static blade 108 and/or a floating blade 110 and may include one or more particle screens 112. The static blade 108 may be configured such that a shaft 114 extends therethrough and/or is statically fastened to the static blade 108. The static blade 108 may be configured such that to have one or more blade portions. The one or more blade portions may be diametrically opposed and/or positioned equidistantly about the static blade 108. Each of the respective blade portions of the static blade 108 may be configured to have at least two cutting surfaces, one on each side of a respective blade portion, opposite from each other. The static blade 108 may be configured to have one or more serrated cutting edges and/or one or more plain cutting edges. The floating blade 110 may comprise one or more food-grade bearings configured such that the shaft 114 extends therethrough without imposing a rotational force on the floating blade 110. The floating blade 110 may be configured to rotate independently of the shaft 114 and the static blade 108. The floating blade 110 may be configured to have one or more blade portions. The one or more blade portions of the floating blade 110 may be diametrically opposed and/or positioned equidistantly about the floating blade 110. Each of the respective blade portions of the floating blade 110 may be configured to have at least two cutting surfaces, one on each side of a respective blade portion, opposite from each other. The floating blade 110 may be configured to have one or more serrated cutting edges and/or one or more plain cutting edges. The particle screen 112 may be configured such that the shaft 114 extends therethrough without imposing a rotational force on the particle screen 112. The particle screen 112 may be configured to remain stationary as the shaft 114 rotates. The particle screen 112 may be substantially disc-shaped with a planar surface and configured to have a number of cavities disposed in the surface. The particle screen 112 may be configured such that it is interchangeable with a particle screen 112 having different size and/or shape cavities. The planar surface of the particle screen 112 may be configured to have a radius that is greater than or substantially equal to the larger diameters of the static blade 108 and/or the floating blade 110.

The grinder 102 may include a casing 116 configured to provide structural support for some or all of the components of the grinder 102. The casing 116 may be comprised of a food-grade quality steel such that it is resistant to bacterial growth. The casing 116 may be configured to enclose the cutting mechanism 106, a motor 118, and/or a chute 120 that may be connected to the cutting mechanism 106. The casing 116 may include wheels configured to move the grinder 102. The casing 116 may be configured such that a side wall of the casing 116 is temporarily removable such that a user may access the cutting mechanism 106, the motor 118, and/or the chute 120. The chute 120 may be configured to catch and transport the plant(s) 104 after being processed through the cutting mechanism 106. The chute 120 may be configured to enclose the cutting mechanism 106. Additionally, or alternatively, the chute 120 may be arranged below the cutting mechanism 106 and configured to catch the processed version of the plant(s) 104, after being cut by the cutting mechanism 106. In examples, the chute 120 may be arranged and configured to transport the processed version of the plant(s) 104 from the cutting mechanism 106 to an outside of the casing 116 of the grinder 102. Additionally, or alternatively, the chute 120 may be configured to transport the processed version of the plant(s) 104 to a collection bin on the inside of the casing 116 of the grinder 102.

The motor 118 may be operably coupled to a number of components of the grinder 102. The motor 118 may be configured such that a user may specify a standard of speed, such as, for example, a percentage of available power from the motor 118 at which the motor 118 will operate. In some examples, the motor 118 may be configured to operate at any value from 0 to 100 percent of the available power from the motor 118, where 0 percent may be the lowest available power from the motor 118 and 100 percent may be the highest available power from the motor 118. In examples, the motor 118 may be configured to provide operational power to a number of components of the grinder 102 at the speed specified by the user.

The grinder 102 may include a hopper 122. The hopper 122 may be mounted on top of the casing 116. Additionally, or alternatively, the hopper 122 may be separate from the casing 116 and/or mounted to the side of the casing 116. The hopper 122 may be configured to temporarily store unprocessed plant(s) 104 before being cut in the grinder 102. The hopper 122 may have an opening on the top surface such that a user can place the unprocessed plant 104 for cutting. The hopper 122 may have a hinged lid 124 configured to close the opening on the top surface of the hopper. In examples, the hopper 122 may be substantially shaped as a triangular prism configured to funnel the unprocessed plant(s) 104 placed therein from the top end of the hopper 122 to the bottom end of the hopper 122. Additionally, or alternatively, the hopper 122 may be substantially shaped as a number of geometric prisms, for example, the hopper 122 may be rectangular, spherical, or anything of the like. The hopper 122 may be arranged such the opening on the top surface of the hopper 122 is the widest portion of the hopper 122, and the hopper 122 continuously narrows moving downward to form a funnel like shape. The hopper 122 may have an auger, or a screw 126 disposed on the inside the volume of hopper 122. The auger 126 may be operably coupled to the motor 118 of the grinder 102. The auger 126 may be configured to rotate and move the unprocessed plant(s) 104 to a side of the hopper 122 and in a first direction toward the cutting mechanism 106. Additionally, or alternatively, the auger 126 may be configured to rotate in a second direction away from the cutting mechanism 102. The auger 126 may be arranged such that it is at the bottom and/or narrowest portion of the hopper 122. The hopper 122 may have a transparent window portion 128 on one or more sides of the hopper 122, such that a user can safely visualize the inside of the hopper 122 while the grinder 102 is in an off state, and on state, and/or an operational state.

The grinder 102 may include one or more buttons 130 and/or one or more displays 132 mounted on the grinder 102. The display 132 may have at least one processor 134 and at least one memory 136. Additionally, or alternatively, the display 132 may be communicably coupled to one or more external computing devices, having one or more processors 134 and at least one memory 136, in association with the grinder 102. The memory 136 may have instructions stored thereon causing the processor(s) 134 to perform one or more actions, such as, for example, presenting a Graphical User Interface (GUI) on the display 132. The display 132 may comprise a touch interface 138 configured to accept touch input from a user. The GUI may be associated with the touch interface 138 configured to accept input from a user to cause the grinder 102 to perform an action, such as adjusting cutting speed and/or available power available from the motor 118, cutting direction, and hopper functionality, for example. The GUI may also be configured to power on and power off the grinder 102. The grinder 102 may be configured to perform additional actions, such as but not limited to, safety settings, on/off timer, and timed speed changes to form different grinding patterns. The button(s) 130 may be configured to cause the grinder 102 to perform an immediate action upon actuation, without any additional processing. In examples, when a user physical actuates a button 130, the grinder 102 may be configured to cease all operation. In examples, the button(s) 130 may be configured to perform the above-mentioned one or more actions associated with the grinder 102. In examples, the button(s) 130 and/or the display(s) 132 may be mounted on the casing 116 and/or the hopper 122 of the grinder 102.

Figure 2:
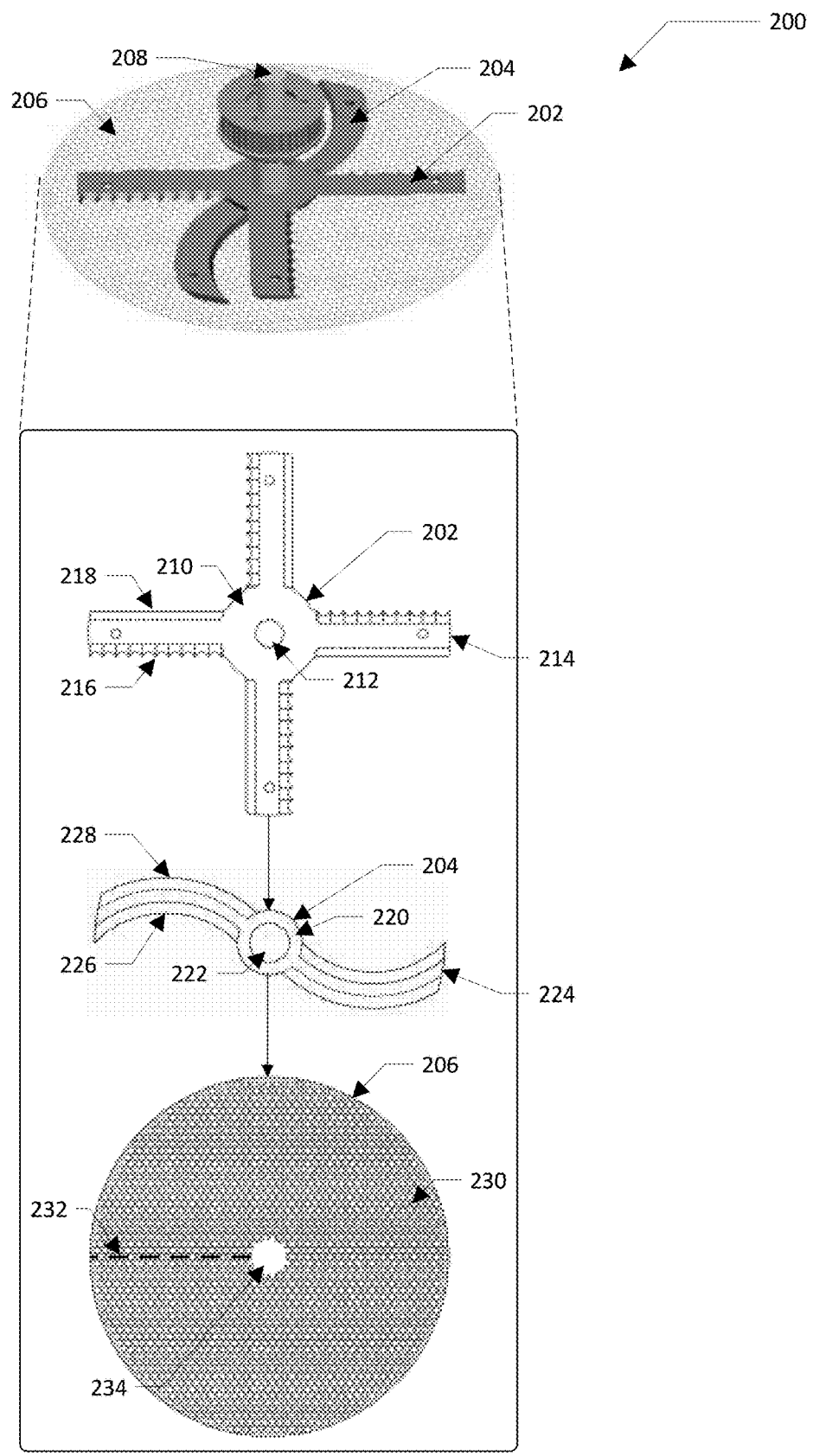
FIG. 2 illustrates an exploded lateral schematic diagram of example components of a cutting mechanism of an agricultural grinder.

FIG. 2 illustrates an exploded lateral schematic diagram of example components of a cutting mechanism 200 used in the grinder 102 from FIG. 1. The cutting mechanism 200 may be comprised of separate parts in combination with one another, such as a static blade 202, a floating blade 204, a particle screen 206, and a shaft 208.

The cutting mechanism 200 may be arranged in a number of ways. In examples, the cutting mechanism 200 may be comprised of any number of blade layers and/or any number of particle screen layers. In examples, the layers may comprise a static blade 202 layer, a floating blade 204 layer, and/or a particle screen 206 layer. In examples, the floating blade 204 may be arranged such that the static blade 202 is above the floating blade 204, and/or the particle screen 206 is below the floating blade 204. In examples, the static blade 202 may be arranged such that the floating blade 204 is above the static blade 202, and/or the particle screen 206 is below the static blade 202. In examples, the cutting mechanism 200 may be configured to rotate in a clockwise or a counterclockwise direction depending on configuration settings defined by input received by the display 132. In examples, the cutting mechanism 200 may be configured such that the static blade 202 may rotate in a first direction, and/or the floating blade 204 may rotate in a second direction opposite of the first direction. The cutting mechanism 200 may be configured such that the static blade 202 may be fixed to and/or rotate with the shaft 208 that is operably coupled to the motor 118 of the grinder 102. The cutting mechanism 200 may be configured such that the floating blade 204 may rotate independently from the shaft 208 that is operably coupled to the motor 118. The cutting mechanism 200 may be configured such that the particle screen 206 may remain stationary as the blades 202, 204 rotate. The cutting mechanism 200 may be configured such that the particle screen 206 is interchangeable. The cutting mechanism may be configured to operate with various particle screen(s) 206 that allow different sized particles of a plant 104 to pass through. The cutting mechanism 200 may be configured such that the particle screen 206 further cuts a plant moving through the cutting mechanism.

The static blade 202 may be arranged in a number of ways. The static blade 202 may have a disc portion 210 having a first circumference. The static blade 202 may have a hole 212 through the middle of the disc portion 210, the hole 212 may be configured such that the shaft 208 extends therethrough and/or is statically fastened to the disc portion 210 of the static blade 202. The static blade 202 may be configured to have one or more blade portions 214. The one or more blade portions 214 may be diametrically opposed and/or positioned equidistantly about the first circumference of the disc portion 210 of the static blade 202. Each of the blade portions 214 may be configured to have a serrated cutting surface 216 and a plain cutting surface 218, one on each side of the respective blade portion 214, the cutting surfaces 216, 218 being on opposite sides. The cutting surfaces 216, 218 of the static blade 202 may extend radially outward from the disc portion 210 to a second circumference that is greater than the first circumference of the disc portion 210 of the static blade 202. The serrated cutting surface 216 may be formed by a serrated edge comprising any number of teeth. A single tooth of the teeth may be formed by a first arched recess in the serrated cutting surface 216 meeting a neighboring second arched recess in the serrated cutting surface 216, the meeting point forming a point of the tooth. The static blade 202 may be comprised of a food-grade steel such that it is resistant to bacterial growth.

The floating blade may be arranged in a number of ways. The floating blade 204 may have a disc portion 220 having a third circumference that is substantially similar to the first circumference of the static blade 202. The floating blade 204 may have a hole 222 through the middle of the disc portion 220, the hole 222 may comprise one or more food-grade bearings configured such that the shaft 208 extends therethrough without imposing a rotational force on the floating blade 204. The floating blade 204 may be configured to rotate independent from the shaft 208 and in response to the plant 104 moving through the cutting mechanism 200. The floating blade 204 may be configured to have one or more blade portions 224. The one or more blade portions 224 may be diametrically opposed and/or positioned equidistantly about the disc portion 220 of the floating blade 204. Each of the blade portions 224 may be configured to have two cutting surfaces 226, 228, one on each side of the respective blade portion 224, the cutting surfaces 226, 228 being on opposite sides. The cutting surfaces 226, 228 of the floating blade 204 may curve radially outward from the third circumference of the disc portion 220 to the second circumference that is greater than the third circumference, forming two paralleled curved cutting surfaces 226, 228. The cutting surfaces 226, 228 may be any surface used for cutting, such as a serrated edge, a plain edge, etc. A plain cutting edge may be formed on the cutting surfaces 226, 228 of a blade portion 224 by a linear recession from the parallel axis of the respective blade portion 224 toward the respective cutting surfaces 226, 228. The floating blade 204 may be comprised of a food-grade steel such that it is resistant to bacterial growth.

The particle screen 206 may be arranged in a number of ways. The particle screen 206 may be configured to catch a plant 104 moving through the cutting mechanism 200 that has not yet been ground to a desired particle size. The particle screen 206 may be a disc shaped planar surface having a number of cavities 230 in the surface. The particle screen 206 may have a radius 234 that is greater than or equal to the second diameter which the blade portions of the of the static blade 202 and/or the cutting blade 204 extend to. The cavities 230 may be any shape, for example, the cavities 230 may be configured to be a circular shape similar to the surface of the particle screen 206. The cavities 230 may be configured to resemble other shapes, for example, the cavities 230 may be square, oval, rectangular, triangular, etc. The particle screen 206 may be configured such that it is interchangeable with other particle screens 206 having different sized cavities 230. The cavities 206 may be configured to further cut the plant 104 moving through the cutting mechanism 200. The particle screen 206 may be configured such that the shaft 208 of the grinder 102 extends through a hole 234 in the middle of the planar surface of the particle screen 206. The particle screen 206 may be configured to remain stationary as the shaft 208 rotates components of the cutting mechanism 200. The particle screen 206 may be comprised of a food-grade steel such that it is resistant to bacterial growth.

Figure 3:
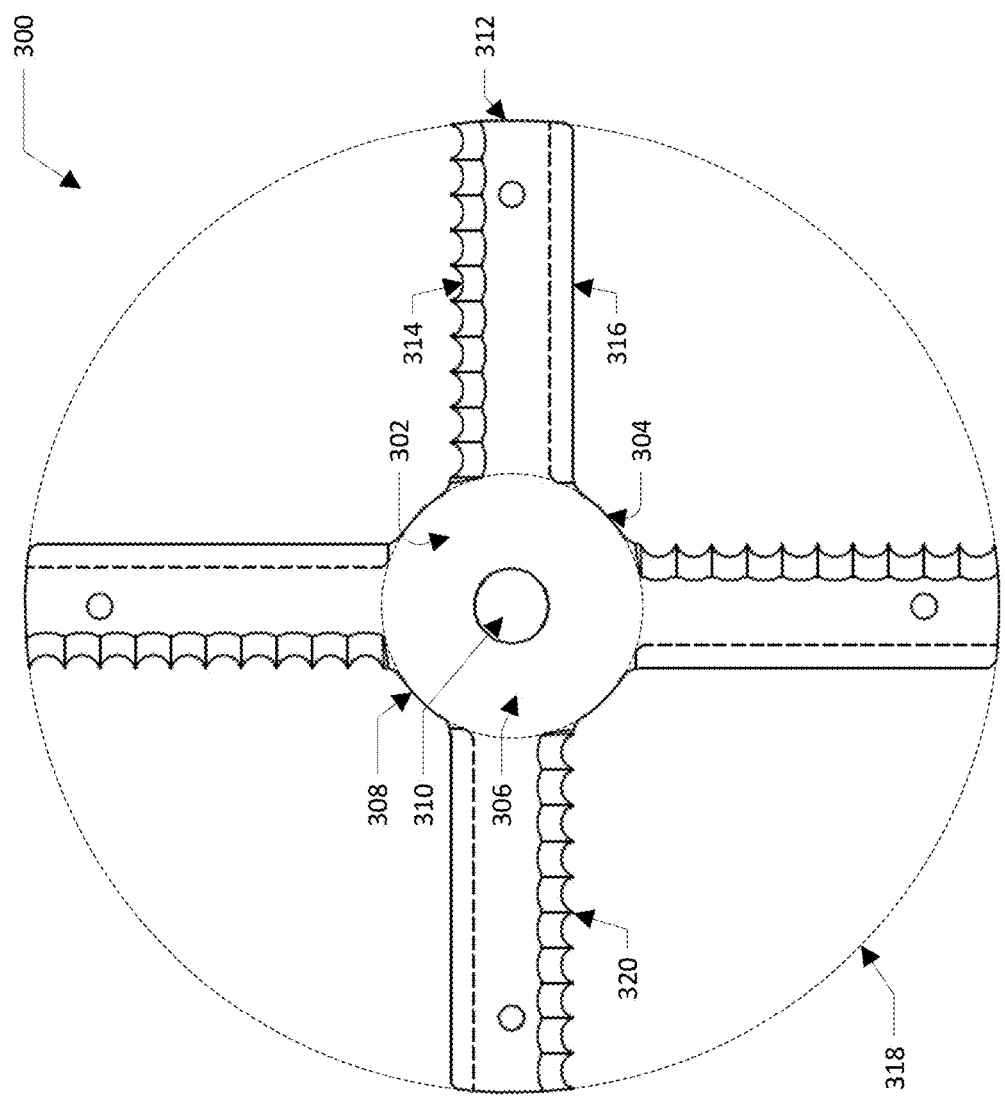
FIG. 3 illustrates a schematic diagram of an example static blade of an agricultural grinder.

FIG. 3 illustrates an example schematic diagram of an example static blade 300 of an agricultural grinder 102. The static blade 300 may include the same or similar components and/or attributes of the static blades 108 and 202 from FIG. 1 and FIG. 2, respectively. The static blade 300 may be configured to shear an unprocessed plant 104 placed in the grinder 102. Additionally, or alternatively, the static blade 300 may be configured to temporarily secure an unprocessed plant 104 placed in the grinder 102 to a cutting surface.

The static blade 300 may be arranged in a number of ways. The static blade 300 may have a first planar surface 302 and a second planar surface 304 opposite the first planar surface 302. The static blade 300 may have a disc portion 306 having a first circumference 308. The static blade 300 may have a hole 310 through the middle of the disc portion 306, the hole 310 may be configured such that the shaft 114 of the grinder 102 extends therethrough and/or is statically fastened to the disc portion 306 of the static blade 300. The static blade 300 may be configured to have one or more blade portions 312. The one or more blade portions 312 may be diametrically opposed and/or positioned equidistantly about the first circumference 308 of the disc portion 306 of the static blade 300. Each of the blade portions 312 may be configured to have a serrated cutting surface 314 and/or a plain cutting surface 316, one on each side of the respective blade portion 312, the cutting surfaces 314, 316 being on opposite sides. The cutting surfaces 314, 316 of the static blade 300 may extend radially outward from the first circumference 308 of the disc portion 306 to a second circumference 318 that is greater than the first circumference 308 of the static blade 300. The serrated cutting surface 314 may be formed by a serrated edge comprising any number of teeth. A single tooth 320 of the teeth may be formed by a first arched recess in the serrated cutting surface 314 meeting a neighboring second arched recess in the serrated cutting surface 314, the meeting point forming a point of the tooth 320. The serrated cutting surface 314 may be configured to temporarily secure at least a portion of the plant 104 moving through the cutting mechanism 106 such that at least the portion of the plant 104 rotates in a direction with the serrated cutting surface 314. The plain cutting surface 316 may be formed on the blade portion 312 by a linear recession from a radial axis along the respective blade portion 312 toward the plain cutting surface 316. The static blade 300 may be comprised of a food-grade steel such that it is resistant to bacterial growth. The static blade 300 may be arranged such that the first planar surface 302 makes first contact with a plant 104 entering the cutting mechanism 106 of the grinder 102.

Figure 4:
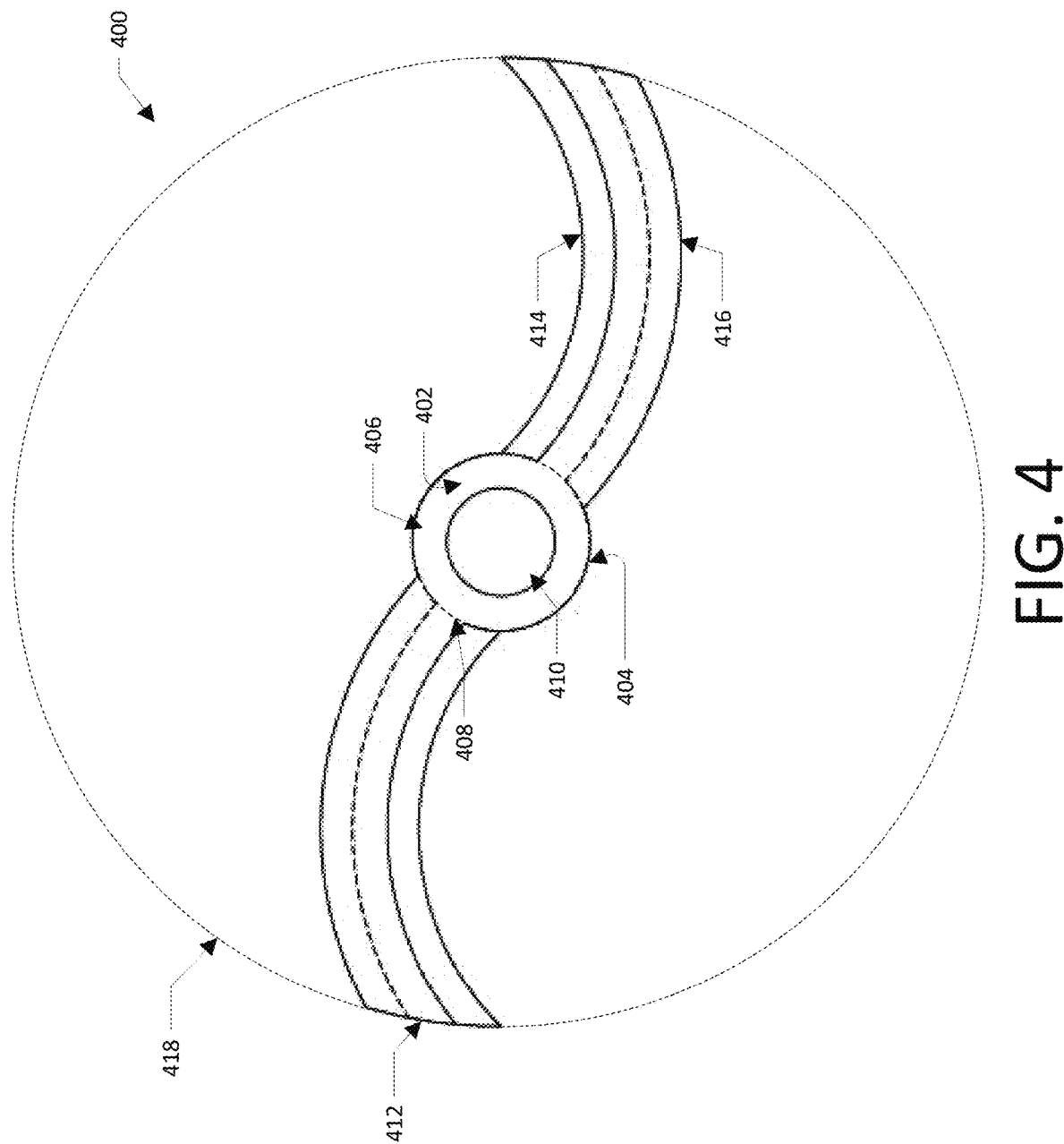
FIG. 4 illustrates a schematic diagram of an example floating blade of an agricultural grinder.

FIG. 4 illustrates an example schematic diagram of an example floating blade 400 of an agricultural grinder 102. The floating blade 400 may include the same or similar components and/or attributes of the floating blades 110 and 204 from FIG. 1 and FIG. 2, respectively. The floating blade 400 may be configured to shear an unprocessed plant 104 placed in the grinder 102.

The floating blade 400 may be arranged in a number of ways. The floating blade 400 may have a first planar surface 402 and a second planar surface 404 opposite the first planar surface 402. The floating blade 400 may have a disc portion 406 having a first circumference 408 that is substantially similar to the first circumference of the static blade 300 in FIG. 3. The floating blade 400 may have a hole 410 through the middle of the disc portion 406, the hole 410 may comprise one or more food-grade bearings configured such that the shaft 114 of the grinder 102 extends therethrough without imposing a rotational force on the floating blade 400. The floating blade 400 may be configured to rotate independent from the shaft 114 and in response to the plant 104 moving through the cutting mechanism 106 of the grinder 102. The floating blade 400 may be configured to have one or more blade portions 412. The one or more blade portions 412 may be diametrically opposed and/or positioned equidistantly about the first circumference 408 of the floating blade 400. Each of the blade portions 412 may be configured to have two cutting surfaces 414, 416, the cutting surfaces 414, 416 being on opposite sides of the respective blade portion 412. The cutting surfaces 414, 416 of the floating blade 400 may curve radially outward from the first circumference 408 of the disc portion 406 to a second circumference 418 that is greater than the first circumference 408, forming two paralleled curved cutting surfaces 414, 416. The cutting surfaces 414, 416 may be any surface used for cutting, such as a serrated edge, a plain edge, etc. A plain cutting edge may be formed on the cutting surfaces 414, 416 of a blade portion 412 by a linear recession from the parallel axis of the respective blade portion 412 toward the respective cutting surfaces 414, 416. The floating blade 400 may be comprised of a food-grade steel such that it is resistant to bacterial growth. The floating blade 400 may be arranged such that the first planar surface 402 neighbors the static blade 108 and the second planar surface 404 neighbors the particle screen 112 of the grinder 102.

Figure 5:
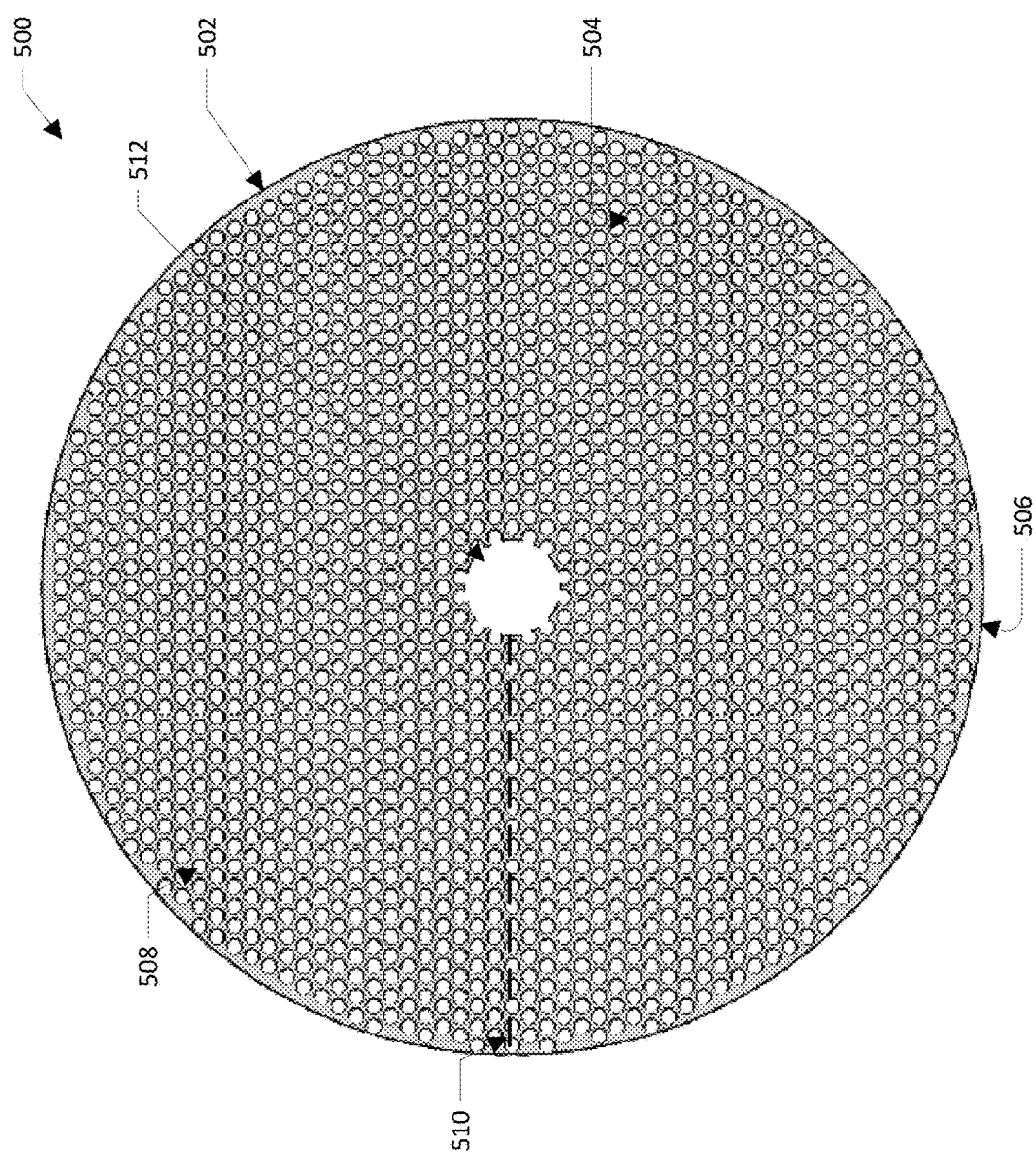
FIG. 5 illustrates a schematic diagram of an example particle screen of an agricultural grinder.

FIG. 5 illustrates an example schematic diagram of an example particle screen 500 of an agricultural grinder 102. The particle screen 500 may include the same or similar components and/or attributes of the particle screens 112 and 206 from FIG. 1 and FIG. 2, respectively. The particle screen 500 may be configured to catch a plant 104 moving through the cutting mechanism 106 of the grinder 102. The particle screen 500 may be configured to further shear a plant 104 moving through the cutting mechanism 106 of the grinder 102.

The particle screen 500 may be arranged in a number of ways. The particle screen 500 may be configured to catch a plant 104 moving through the cutting mechanism 106. The particle screen 500 may be configured such that the plant 104 is unable to pass through the particle screen 500 if the plant 104 has not been cut to a desired particle size. The particle screen 500 may be a disc shaped planar surface 502 having a first side 504 and a second side 506. The particle screen may have a number of cavities 508 in the surface. The cavities 508 may be configured to restrict passage of the plant 104 from exiting the cutting mechanism 106. The cavities 508 may be configured to keep the plant 104 in line of the blades of the cutting mechanism 106. The cavities may be configured to further cut or shear the plant 104 moving through the cutting mechanism 106. The cavities 508 may be any shape, for example, the cavities 508 may be configured to be a circular shape similar to the planar surface 502 of the particle screen 500. The cavities 508 may be configured to resemble other shapes, for example, the cavities 508 may be square, oval, rectangular, triangular, etc. The particle screen 500 may be configured such that it is interchangeable with other particle screens 500 having different sized cavities 508. The particle screen 500 may have a radius 510 that is greater than or equal to the second diameter that each of the respective blade portions of the of the static blade 108 and/or the floating blade 110 extend to. The particle screen 500 may be configured such that the shaft 114 of the grinder 102 extends through a hole 512 in the middle of the planar surface 502 of the particle screen 500. The particle screen 500 may be configured to remain stationary as the shaft 114 rotates. The particle screen 500 may be comprised of a food-grade steel such that it is resistant to bacterial growth.

Figure 6:
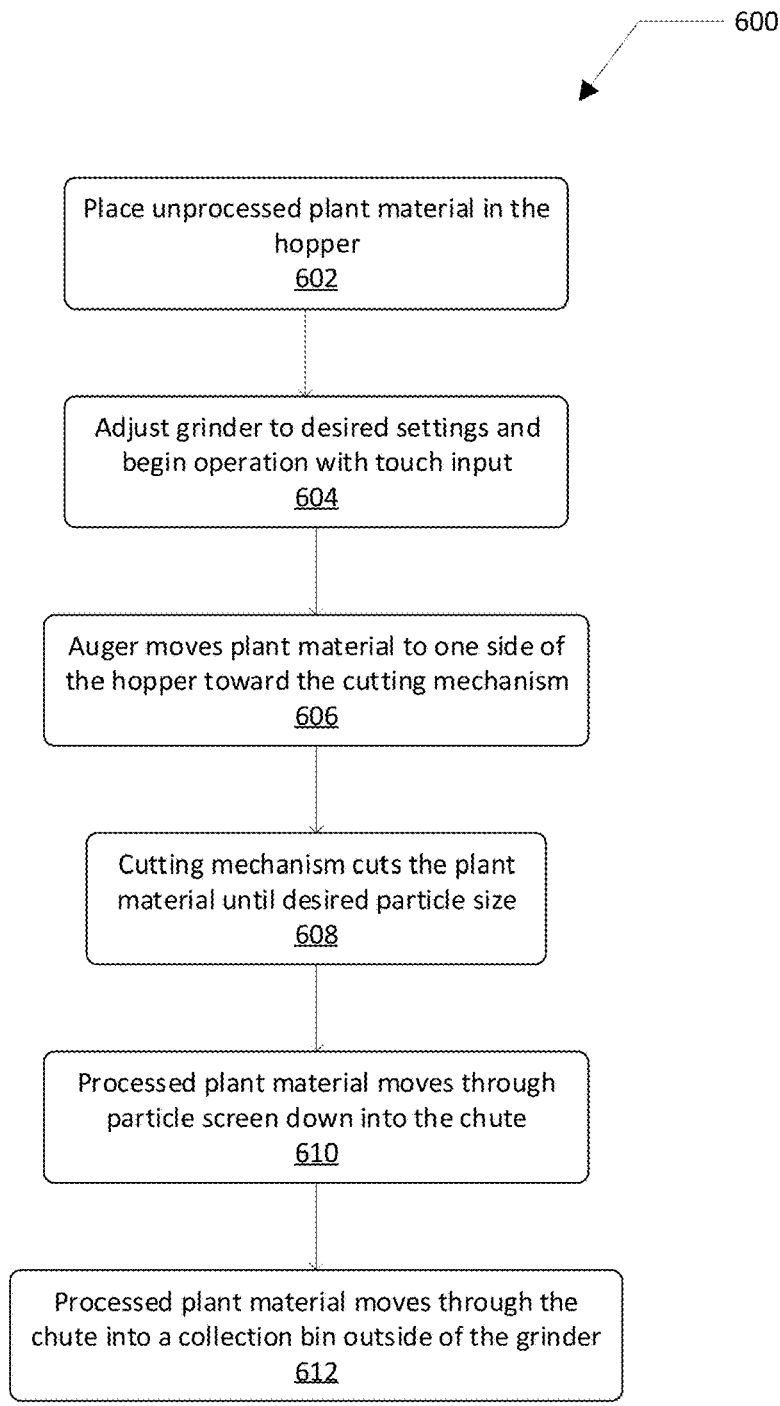
FIG. 6 illustrates a flow diagram of an example process for processing an unprocessed plant with an agricultural grinder.
Figure 7:
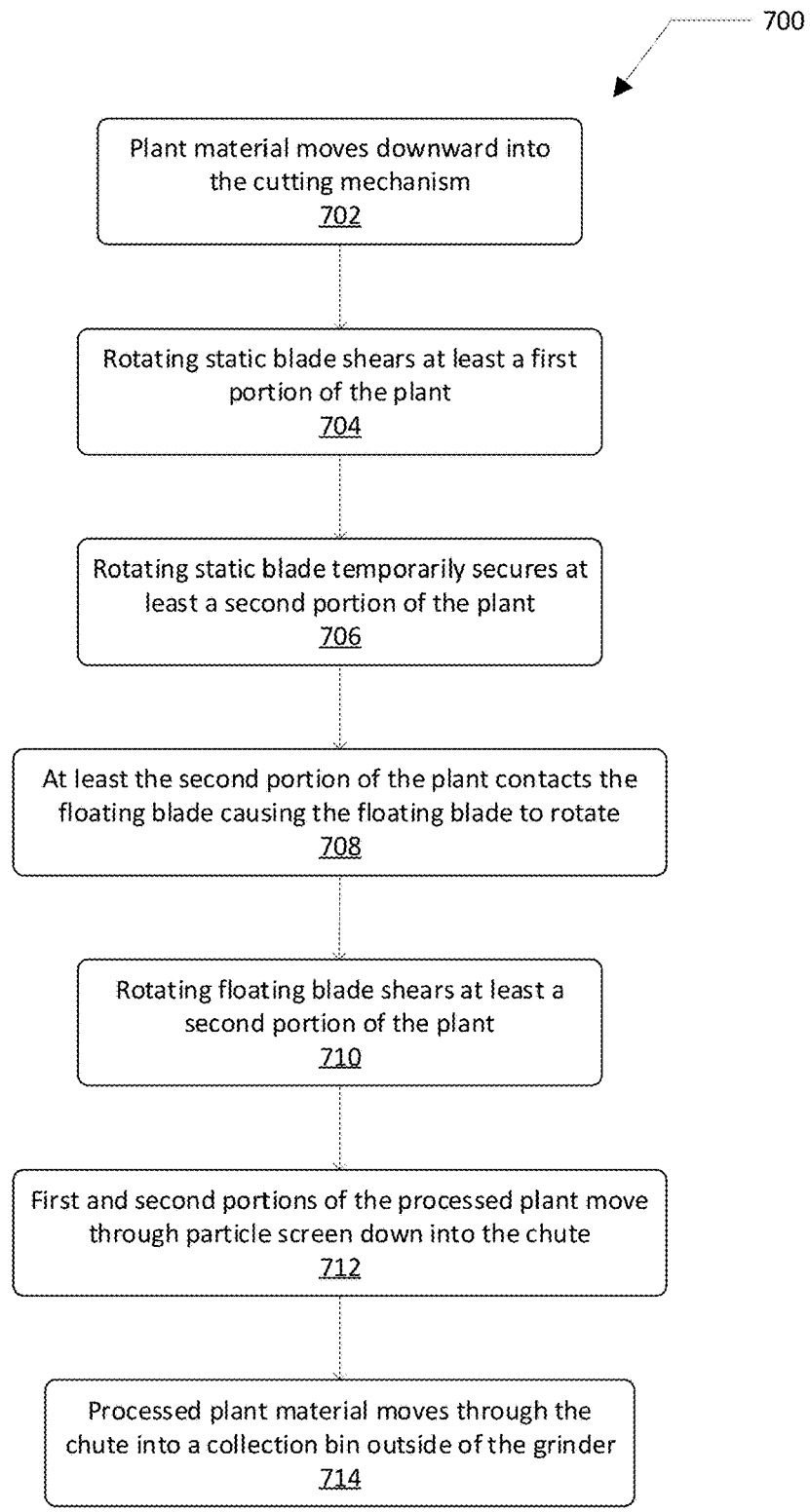
FIG. 7 illustrates a flow diagram of an example process for a cutting mechanism cutting an unprocessed plant.

FIGS. 6 and 7 illustrate processes for processing a plant with an example grinder. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures and systems.

FIG. 6 illustrates a flow diagram of an example process 600 for processing an unprocessed plant 104 with an example grinder 102.

At block 602, process 600 may include placing an unprocessed and/or partially unprocessed version of a plant in the hopper of the grinder. The hopper may have a hinged lid that swings open to expose an opening of the hopper. The user may place a desired amount of the plant in the hopper and check the hopper window to verify the correct amount have been placed in the hopper. The plant may be comprised of a number of parts including but not limited to, stems, seeds, roots, and/or flowers. The plant may be, for example, a hemp plant.

At block 604, process 600 may include adjusting the settings of the grinder to the desired settings and beginning operation of the grinder. The user may turn on the grinder by pressing a button and/or actioning the display. The grinder may have a number of settings that the user is able to adjust to their liking. For example, the user may change the particle screen to one having a differing cavity size. Additionally, or alternatively, the user may interact with the touch display to change a number of operational settings. The user may select the desired operation settings for the grinder by touching the GUI elements on the display. For example, the user may wish to change the cutting direction of the blades, the cutting speed, the auger speed, etc., and may do so by interacting with the touch interface of the display. Additionally, or alternatively, the user may commence operation of the grinder by providing touch input to the touch interface of the display. The user may start the cutting mechanism by selecting an action on the display. The user may start the auger and the cutting mechanism separately.

At block 606, process 600 may include rotating the auger which may be configured to push the hemp toward the cutting mechanism. As the auger rotates and moves the hemp toward the cutting mechanism, hemp in the top portion of the hopper may move downward toward the auger of the hopper. The user may look through the transparent side window of the hopper to verify the hemp is moving downward toward the auger and the auger is moving the hemp in the correct direction. As the plant moves toward the cutting mechanism, the plant moves downward into the cutting mechanism. As the hemp falls through and gets cut by the cutting mechanism, additional hemp may move from the top of the hopper to the bottom of the hopper. In the event of a jam or for safety purposes, the user may interact with the display to cease operation of the auger and/or the cutting mechanism. Additionally, or alternatively, the user may interact with the display to change a rotational direction of the auger and/or the cutting mechanism. Rotation of the auger may be manual and/or may be caused to be performed by a processor executing computer-readable instructions.

At block 608, the process 600 may include cutting the hemp with the cutting mechanism until the hemp reaches a desired particle size. The cutting mechanism may cut or shear the hemp using the static blade and the floating blade together. Additionally, or alternatively, the particle screen can be configured to further cut or shear the hemp plant. As the static blade rotates toward the serrated edge, the hemp is cut. As the static blade rotates and cuts the hemp, the serrated edge of the static blade is configured to hold the hemp as it makes contact. As the hemp that is held by the static blade rotates with the static blade it comes into contact with a cutting surface of the floating blade that is positioned below the static blade. As the hemp comes into contact with the floating blade the hemp may be further cut by the floating blade, which may change rotational direction as needed to cut the hemp to a desired particle size. The hemp may remain in the cutting mechanism until the hemp reaches a particle size that fits through the particle screen. Additionally, or alternatively, as the hemp that is held by the static blade is cut by the floating blade, the particle screen may further sheer portions of the hemp plant. In the event that the cutting mechanism slows or jams, the user may reverse the rotational direction of the static blade by providing input to the touch display.

At block 610, the process 600 may include the hemp moving through the particle screen down into the chute. Only a portion of the hemp may move through the particle screen at a time, while hemp that is too coarse to fit through the particle screen remains in the cutting mechanism. As hemp falls through the particle screen into the chute, additional hemp may move from the hopper into the cutting mechanism.

At block 612, the process 600 may include the hemp moving through the chute into a collection bin. The collection bin may be located outside of the casing of the grinder, and the chute may be configured to transport the processed hemp from the cutting mechanism to the outside of the casing of the grinder. Additionally, or alternatively, the collection bin may be located inside the casing of the grinder, and the chute may be configured to transport the processed hemp from the cutting mechanism to a collection bin on the inside of the casing.

FIG. 7 illustrates a flow diagram of an example process 700 for the cutting mechanism 106 cutting an unprocessed plant 104. The unprocessed plant may be comprised of a number of parts including but not limited to, stems, seeds, roots, and/or flowers. The plant may be, for example, a hemp plant.

At block 702, the process 700 may include the unprocessed hemp moving from the hopper into the cutting mechanism. As the cutting mechanism cuts the hemp, the hemp moves out of the cutting mechanism and into the chute. As the hemp moves out of the cutting mechanism, additional hemp may move into the cutting mechanism from the hopper. The hopper may continuously move hemp toward the cutting mechanism.

At block 704, the process 700 may include rotating the static blade of the cutting mechanism with an imposing rotational force imposed by the shaft. The static blade may rotate in a first direction leading with the serrated edge. As the static blade rotates, at least a first portion of the hemp is cut or sheared. Additionally, or alternatively, the user may adjust the operation of the grinder to change the rotational direction of the static blade. As the static blade changes rotational direction and rotates in a second direction, leading with the plain edge, at least a first portion of the hemp is cut or sheared.

At block 706, the process 700 may include temporarily securing at least a second portion of the hemp with the rotating static blade of the cutting mechanism, while the static blade is rotating in the first direction. While the static blade may cut or shear at least a first portion of the hemp, a second portion of the plant may not be cut, but rather temporarily secured by the teeth of the serrated edge of the static blade. As the second portion of the hemp is secured by the serrated edge of the static blade, the hemp may rotate in the cutting mechanism with the static blade.

At block 708, the process 700 may include at least the second portion of the hemp contacting the floating blade. The floating blade may rotate in response to the hemp contacting the floating blade. The hemp that contacts the floating blade may be temporarily secured to a serrated edge of the static blade. As the temporarily secured portion of the hemp contacts the floating blade, the static blade and the floating blade work together to cut or shear the hemp. As the temporarily secured portion of the hemp contacts the floating blade, a portion of the secured hemp may remain temporarily secured to the serrated edges of the static blade.

At block 710, the process 700 may include cutting or shearing the hemp with the rotating floating blade. As the hemp moves through the cutting mechanism, the hemp does not exit the cutting mechanism until it reaches a particle size that fits through the cavities of the particle screen. As the floating blade is contacted with temporarily secured portions of the hemp, the floating blade rotates. The floating blade may rotate in either a clockwise or a counter clockwise direction, depending on the imposing force of the temporarily secured hemp. As hemp that is too coarse remains on the particle screen, the floating blade may continue to cut or shear the hemp until it reaches a desired particle size and falls through the particle screen.

At block 712, the process 700 may include the first and second portions of the hemp plant moving through the particle screen. For example, the first portion of the hemp that is not temporarily secured to a serrated edge of the static blade may reach a desired particle size and move through the one or more cavities of the particle screen. Additionally, the second portion of the hemp that was at one point temporarily secured to a serrated edge of the static blade may reach a desired particle size and move through the one or more cavities of the particle screen. As the hemp moves through the particle screen, the hemp moves into the chute. As the hemp moves through the particle screen, additional hemp may move from the hopper into the cutting mechanism.

At block 714, the process 700 may include moving the processed hemp through a chute into a collection bin on the outside of the casing of the grinder. Additionally, or alternatively, the collection bin may be arranged to be on the inside of the casing of the grinder. As the processed hemp moves into the chute, the hemp moves through the chute into a collection bin where a user can assess the processed version of the hemp.

As used herein, a processor, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information, and which may be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
  a cutting mechanism configured to cut material moving therethrough, the material being placed in a hopper;
  a shaft;
  a chute, configured to guide the material from the cutting mechanism to a container;
  the hopper comprising a screw configured to move the material placed in the hopper to the cutting mechanism;
  the cutting mechanism comprising:
    a first disc surrounding the shaft, the first disc including:
      a first top planar side;
      a first bottom planar side opposite the first top planar side;
      a first hole through which the shaft extends, the shaft being statically fastened to the first disc and the first disc having a first radius that extends outward from the first hole to a first circumference of the first disc; and
      one or more first blades, first individual blades of the one or more first blades being diametrically opposed and positioned equidistantly about the first circumference of the first disc, and the first individual blades including:
        a first cutting surface extending radially outward from the first disc to a second circumference, wherein the second circumference is greater than the first circumference; and
        a second cutting surface extending radially from the first disc to the second circumference, the second cutting surface being opposite from the first cutting surface, wherein one of the first cutting surface or the second cutting surface comprise one of a serrated edge or a plain edge;
    a second disc surrounding the shaft, the second disc including:
      a second top planar side;
      a second bottom planar side opposite the second top planar side;
      a second hole through which the shaft extends, the second hole being configured such that the second disc spins independently about the shaft and the second disc having a second radius that extends outward from the second hole to a third circumference of the second disc, the second radius being different from the first radius; and
      one or more second blades, second individual blades of the one or more second blades being diametrically opposed, and positioned equidistantly about the third circumference of the second disc, and the second individual blades including:
        a third cutting surface curving radially outward from the second disc to the second circumference; and
        a fourth cutting surface curving radially outward from the second disc to the second circumference, the fourth cutting surface being paralleled to the third cutting surface from the third circumference to the second circumference; and
    a third disc surrounding the shaft, the third disc including:
      a third hole through which the shaft extends;
      a planar surface having a third top planar side and a third bottom planar side opposite the third top planar side, the planar surface having a third radius that extends outward from the third hole to at least the second circumference, the third radius being different from the first radius and the second radius; and
      one or more cavities of a predetermined size in the planar surface of the third disc.

2. The system of claim 1, further comprising:
  rotating, by a motor, the shaft in a first direction, the first direction being a rotational direction such that an edge of the first cutting surface is leading; and
  wherein the second disc is configured to rotate in the first direction and in a second direction opposite the first direction based, at least in part, on a movement of the material through the cutting mechanism.

3. The system of claim 1, wherein the cutting mechanism comprises a steel configured to resist bacteria growth.

4. The system of claim 1, wherein the first cutting surface comprises the serrated edge and the serrated edge comprises one or more teeth formed on the first cutting surface, the one or more teeth being configured to temporarily secure the material moving through the cutting mechanism.

5. The system of claim 1, wherein the first bottom planar side of the first disc is proximal to the second top planar side of the second disc, and the second bottom planar side of the second disc is proximal to the third top planar side of the third disc.

6. The system of claim 1, wherein the third disc is configured to remain stationary as the shaft rotates.

7. A cutting device comprising:
  a shaft;
  a cutting mechanism configured to cut material moving therethrough, the cutting mechanism comprising:
    a first disc surrounding the shaft, the first disc including:
      a first top planar side;
      a first bottom planar side opposite the first top planar side;
      a first hole through which the shaft extends, the shaft being statically fastened to the first disc and the first disc having a first radius that extends outward from the first hole to a first circumference of the first disc; and
      one or more first blades, first individual blades of the one or more first blades being diametrically opposed and positioned equidistantly about the first circumference of the first disc, and the first individual blades including:

a first cutting surface extending radially outward from the first disc to a second circumference, wherein the second circumference is greater than the first circumference; and a second cutting surface extending radially from the first disc to the second circumference, the second cutting surface being opposite from the first cutting surface, wherein one of the first cutting surface or the second cutting surface comprise one of a serrated edge or a plain edge;

a second disc surrounding the shaft, the second disc including:

a second top planar side;

a second bottom planar side opposite the second top planar side;

a second hole through which the shaft extends, the second hole being configured such that the second disc spins independently about the shaft and the second disc having a second radius that extends outward from the second hole to a third circumference of the second disc; and one or more second blades, second individual blades of the one or more second blades being diametrically opposed, and positioned equidistantly about the third circumference of the second disc, and the second individual blades including:

a third cutting surface curving radially outward from the second disc to the second circumference; and a fourth cutting surface curving radially outward from the second disc to the second circumference, the fourth cutting surface being paralleled to the third cutting surface from the third circumference to the second circumference; and a third disc surrounding the shaft, the third disc including:

a third hole through which the shaft extends, the third hole being configured such that the third disc remains stationary as the shaft rotates;

a planar surface having a third top planar side and a third bottom planar side opposite the third top planar side, the planar surface having a third radius that extends outward from the third hole to at least the second circumference; and one or more cavities of a predetermined size in the planar surface of the third disc.

8. The device of claim 7, wherein the material is placed in a hopper, and further comprising:

a steel case enclosing:
the cutting mechanism;
the shaft;
a motor, operably coupled to the shaft, the motor configured to operate at 0 to 100 percent of available power of the motor; and
a chute, configured to guide the material from the cutting mechanism to an outside of the steel case;

the hopper fastened to the steel case, and the hopper comprising an auger that is operably coupled to the motor and configured to move the material placed in the hopper to the cutting mechanism;

a display, fastened to the steel case, and configured to present a graphical user interface (GUI) on the display;

one or more buttons, fastened to the steel case, and configured to stop the motor when actuated; and wherein the GUI is configured to receive input, and the motor is configured to operate in response to the input.

9. The device of claim 7, wherein the cutting mechanism comprises a steel configured to resist bacteria growth.

10. The device of claim 7, wherein the first cutting surface comprises the serrated edge and the serrated edge comprises one or more teeth formed on the first cutting surface.

11. The device of claim 7, wherein the first bottom planar side of the first disc is proximal to the second top planar side of the second disc, and the second bottom planar side of the second disc is proximal to the third top planar side of the third disc.

12. The device of claim 7, further comprising:

rotating, by the motor, the shaft in a first direction, the first direction being a rotational direction such that an edge of the first cutting surface is leading; and wherein the second disc is configured to rotate in the first direction and in a second direction opposite the first direction based, at least in part, on a movement of the material through the cutting mechanism.

13. A device for cutting material moving therethrough, the device comprising:

a first cutting mechanism surrounding a shaft, the first cutting mechanism including:

a first top planar side;

a first bottom planar side opposite the first top planar side;

a first hole through which the shaft extends, the shaft being statically fastened to the first cutting mechanism and the first cutting mechanism having a first radius that extends outward from the first hole to a first circumference of the first cutting mechanism; and one or more first blades, first individual blades of the one or more first blades being diametrically opposed and positioned equidistantly about the first circumference of the first cutting mechanism, and the first individual blades including:

a first cutting surface extending radially outward from the first cutting mechanism to a second circumference; and a second cutting surface extending radially from the first cutting mechanism to the second circumference, the second cutting surface being opposite from the first cutting surface, wherein one of the first cutting surface or the second cutting surface comprise one of a serrated edge or a plain edge; and a second cutting mechanism surrounding the shaft, the second cutting mechanism including:

a second top planar side;

a second bottom planar side opposite the second top planar side;

a second hole through which the shaft extends, the second hole being configured such that the second cutting mechanism spins independently about the shaft and the second cutting mechanism having a second radius that extends outward from the second hole to a third circumference of the second cutting mechanism; and one or more second blades, second individual blades of the one or more second blades being diametrically opposed, and positioned equidistantly about the third circumference of the second cutting mechanism, and the second individual blades including:

a third cutting surface curving radially outward from the second cutting mechanism to the second circumference; and a fourth cutting surface curving radially outward from the second cutting mechanism to the second circumference, the fourth cutting surface being paralleled to the third cutting surface from the third circumference to the second circumference.

14. The device of claim 13, further comprising:
a planar surface including:
a third top planar side;
a third bottom planar side opposite the third top planar side;
a third hole through which the shaft extends, the third hole being configured such that the planar surface remains stationary as the shaft rotates; and
one or more cavities of a predetermined size in the planar surface, wherein the planar surface has a radius that extends outward from the third hole to at least the second circumference.

15. The device of claim 14, wherein the first bottom planar side of the first cutting mechanism is proximal to the second top planar side of the second cutting mechanism, and the second bottom planar side of the second cutting mechanism is proximal to the third top planar side of the planar surface.

16. The device of claim 14, wherein the one or more cavities in the planar surface are configured to operate as a third cutting mechanism, such that the material passes through the one or more cavities.

17. The device of claim 13, wherein the device comprises a steel configured to resist bacteria growth.

18. The device of claim 13, further comprising:
a motor, configured to rotate the shaft in a first direction, the first direction being a rotational direction such that an edge of the first cutting surface is leading; and
wherein the second cutting mechanism is configured to rotate in the first direction and a second direction opposite the first direction based, at least in part, on a movement of the material through the device.

19. The device of claim 13, wherein the serrated edge comprises one or more teeth formed on the first cutting surface, and the one or more teeth being configured to temporarily secure the material moving through the device.

20. The device of claim 13, further comprising:
a motor, configured to rotate the shaft in a first direction, the first direction being a rotational direction such that an edge of the second cutting surface is leading; and
wherein the second cutting mechanism is configured to rotate in the first direction and a second direction opposite the first direction based, at least in part, on a movement of the material through the device.

* * * * *